United States Patent
Koegel

(10) Patent No.: US 12,202,062 B2
(45) Date of Patent: Jan. 21, 2025

(54) WORKPIECE MATERIAL DETECTOR FOR A POWER TOOL

(71) Applicants: Robert Bosch GmbH, Stuttgart (DE); Robert Bosch Tool Corporation, Broadview, IL (US)

(72) Inventor: Jan Koegel, Oak Park, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 626 days.

(21) Appl. No.: 14/774,239

(22) PCT Filed: Mar. 12, 2014

(86) PCT No.: PCT/US2014/023939
§ 371 (c)(1),
(2) Date: Sep. 10, 2015

(87) PCT Pub. No.: WO2014/164964
PCT Pub. Date: Oct. 9, 2014

(65) Prior Publication Data
US 2016/0016240 A1    Jan. 21, 2016

Related U.S. Application Data

(60) Provisional application No. 61/776,873, filed on Mar. 12, 2013.

(51) Int. Cl.
*B23D 59/00* (2006.01)
*B23D 47/12* (2006.01)

(52) U.S. Cl.
CPC ........... *B23D 59/001* (2013.01); *B23D 47/12* (2013.01)

(58) Field of Classification Search
CPC ...... B23D 47/12; B23D 59/001; B23D 49/08; B27B 5/222; B23Q 17/2447; B23Q 17/2438
(Continued)

(56) References Cited

U.S. PATENT DOCUMENTS 3,076,889 A * 2/1963 Enk ................... B23K 9/1276
219/124.4
3,128,802 A * 4/1964 Hostetter ................. B27B 9/02
83/435.14
(Continued)

FOREIGN PATENT DOCUMENTS

DE  102008000851 A1  10/2009
DE  102009046040 A1  5/2011
(Continued)

OTHER PUBLICATIONS

International Search Report corresponding to PCT Application No. PCT/US2014/023939, mailed Jul. 30, 2014 (3 pages).
(Continued)

*Primary Examiner* — Ghassem Alie
*Assistant Examiner* — Samuel A Davies
(74) *Attorney, Agent, or Firm* — Maginot, Moore & Beck LLP

(57) ABSTRACT

An improvement for a power tool having a motor-driven working tool for performing an operation on a workpiece includes a material sensor positioned to sense the workpiece prior to operation by the working tool. The material sensor is configured to determine a material property of the workpiece and to generate a signal in response thereto. A processor coupled between the material sensor and the motor is configured to control the motor in response to the signal generated by the material sensor.

20 Claims, 3 Drawing Sheets

(58) Field of Classification Search
USPC .................................................. 83/76.7, 76.8
See application file for complete search history.

(56) References Cited

U.S. PATENT DOCUMENTS

| | | | | |
|---|---|---|---|---|
| 4,644,832 A | * | 2/1987 | Smith | B23D 47/005 700/160 |
| 5,718,615 A | * | 2/1998 | Boucher | B23D 59/002 125/13.01 |
| 6,295,907 B1 | * | 10/2001 | Schafer | B23D 59/001 144/357 |
| 6,378,408 B2 | * | 4/2002 | Smith | B23D 59/001 700/193 |
| 6,970,767 B2 | * | 11/2005 | Teraoka | B30B 15/0041 100/43 |
| 7,926,395 B2 | * | 4/2011 | Tokiwa | B23D 55/005 83/72 |
| 2001/0013278 A1 | * | 8/2001 | Hayashi | B23Q 15/22 100/43 |
| 2002/0067797 A1 | * | 6/2002 | Safai | A22C 17/0086 378/54 |
| 2005/0194959 A1 | * | 9/2005 | Miller | G01V 3/088 324/67 |
| 2006/0117580 A1 | * | 6/2006 | Serdynski | B23D 51/16 30/392 |
| 2006/0155582 A1 | * | 7/2006 | Brown | G06F 19/3418 705/3 |
| 2006/0159533 A1 | * | 7/2006 | Zeiler | B23B 51/02 408/226 |
| 2009/0028656 A1 | * | 1/2009 | Forker | B28D 1/18 409/80 |
| 2010/0059144 A1 | * | 3/2010 | Tetelbaum | F16P 3/148 144/356 |
| 2010/0063691 A1 | * | 3/2010 | Hall | E21C 39/00 701/50 |
| 2010/0106284 A1 | * | 4/2010 | Krapf | B23Q 11/0082 700/177 |
| 2010/0114358 A1 | * | 5/2010 | Krapf | F16P 3/147 700/173 |
| 2010/0147124 A1 | * | 6/2010 | Seidel | B23D 59/001 83/72 |
| 2010/0326251 A1 | | 12/2010 | Simon | |
| 2011/0056344 A1 | * | 3/2011 | Dick | B27B 31/06 83/13 |
| 2011/0113939 A1 | * | 5/2011 | Simon | B27G 19/02 83/13 |
| 2011/0226105 A1 | | 9/2011 | Butler et al. | |
| 2012/0011974 A1 | * | 1/2012 | Georgi | B23D 45/003 83/14 |
| 2012/0266665 A1 | * | 10/2012 | Stellmann | B23D 59/001 73/73 |
| 2014/0130643 A1 | * | 5/2014 | Dammertz | B23D 45/061 83/13 |
| 2014/0251105 A1 | * | 9/2014 | Vinarcik | F16P 3/145 83/471 |
| 2017/0225351 A1 | * | 8/2017 | Butler | B27B 5/222 |
| 2019/0314946 A1 | * | 10/2019 | Dey, IV | B23G 1/225 |

FOREIGN PATENT DOCUMENTS

| | | | | |
|---|---|---|---|---|
| EP | | 1645371 A1 | 4/2006 | |
| GB | | 2466383 A | * 6/2010 | .......... B23D 59/001 |
| KR | 20 1991 | 0005389 Y1 | 7/1991 | |
| KR | 10 | 0326142 B1 | 3/2002 | |
| KR | 10 | 0326233 B1 | 3/2002 | |
| WO | | 2008028871 A1 | 3/2008 | |

OTHER PUBLICATIONS

Supplementary European Search Report corresponding to European Patent Application 14 77 9823 (7 pages).

* cited by examiner

WORKPIECE MATERIAL DETECTOR FOR A POWER TOOL

REFERENCE TO RELATED APPLICATION AND PRIORITY CLAIM

This application is a 35 U.S.C. § 371 National Stage Application of PCT/US2014/023939, filed on Mar. 12, 2014, which claims the benefit of priority to U.S. Provisional Application 61/776,873, filed Mar. 12, 2013, the disclosures of which are incorporated herein by reference in their entireties.

TECHNICAL FIELD

This disclosure relates to power tools and, more particularly, to power table saws.

BACKGROUND

Power tools, such as power table saws, planers, miter saws, bevel saws, compound saws, circular saws, or the like have evolved through the years to incorporate various safety mechanisms, such as blade guards, automatic shut-off mechanisms and the like. The power tools have also developed from the saws or cutterheads that are turned on and off by a simple switch to variable speed saws and power tools with electronically controlled drive motors.

For many power tools the mode of operation of the tool may change depending upon the material of the workpiece. For instance, certain materials may require a higher cutting blade speed than other workpiece materials to avoid the risks such as kick-back and splintering, while other workpiece materials may require a lower blade sped to avoid wear and heat damage to the cutting blade.

In order to improve the cutting performance of a power tool it is desirable to know the material of the workpiece so that the operation parameters of the power tool can be adjusted accordingly.

SUMMARY

An improvement is provided for a power tool having a motor-driven working tool for performing an operation on a workpiece. In one aspect, the improvement comprises a material sensor positioned to sense the workpiece prior to operation by the working tool. The material sensor is configured to determine a material property of the workpiece and to generate a signal in response thereto. A processor coupled between the material sensor and the motor is configured to control the motor in response to the signal generated by the material sensor.

The material sensor may include one or more of sensors configured to sense different materials for the workpiece, such as wood or metal, and to sense the presence of a metal contaminant in a non-metallic workpiece. The operation of the motor is a function of the workpiece material, as detected by the material sensor and controlled by the processor. In one aspect, the processor may include a table look-up feature that obtains a motor control protocol based on signals from the material sensor(s).

DETAILED DESCRIPTION

Figure 1:
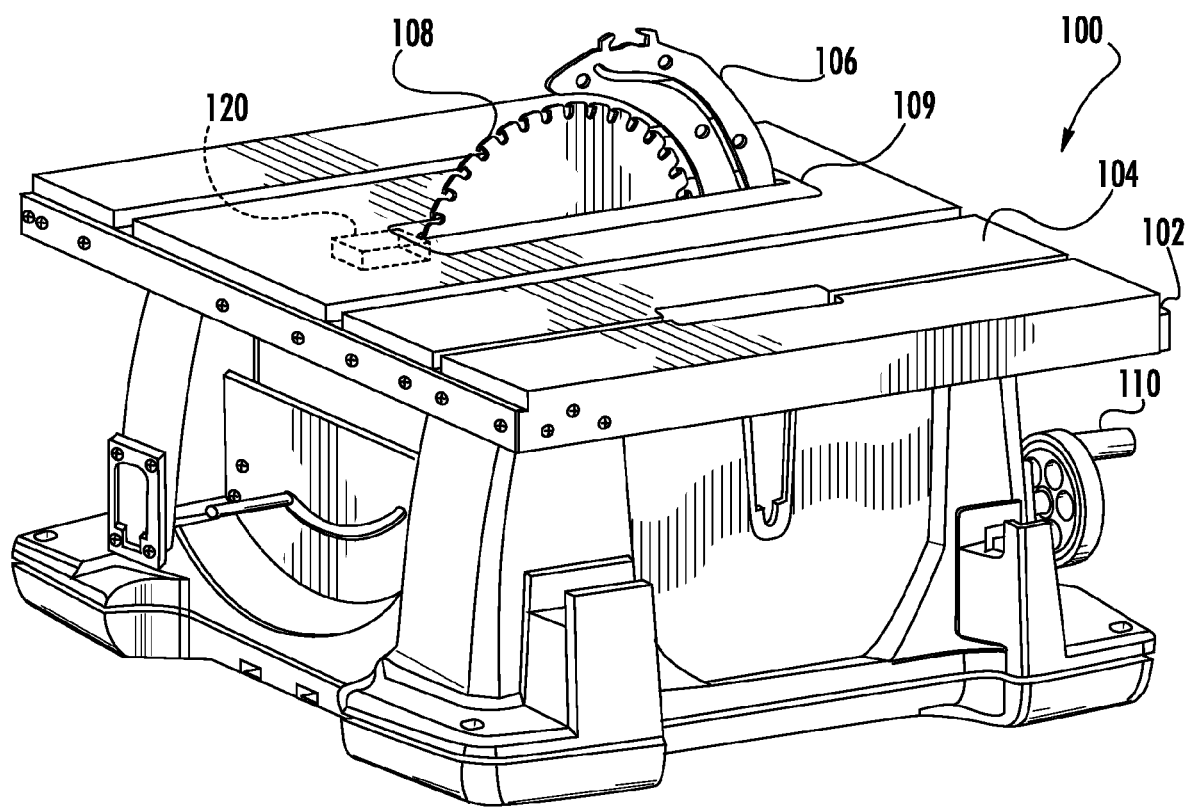
FIG. 1 depicts a top front perspective view of a table saw incorporating a workpiece material sensor as disclosed herein.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
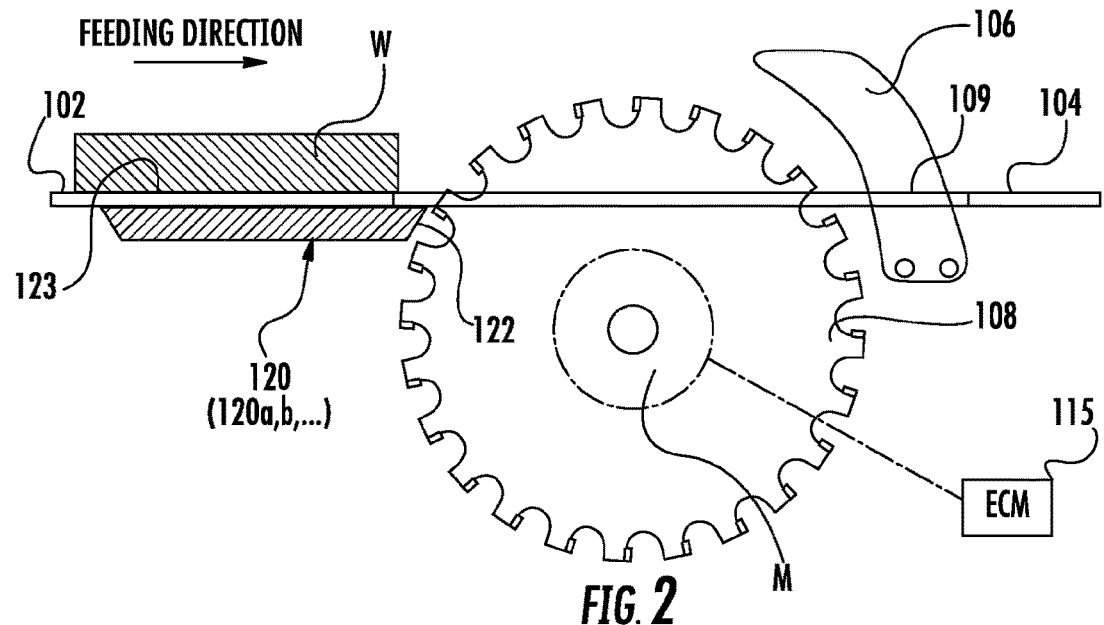
FIG. 2 depicts a schematic side view of a material sensor for use with the table saw of FIG. 1.

One example of a power tool, namely a table saw, is shown in FIGS. 1 and 2. The power tool may also be a planer, a miter saw, a bevel saw, a compound saw, a vertical saw, a band saw, a router, a circular saw, or the like. The table saw 100 includes a table 102 that includes a work surface 104 for supporting a workpiece W (FIG. 2) to be cut. The table 102 defines a slot 109 through which a working tool 108, such as a rotary saw blade, projects. In other tools, the working tool 108 may take other forms, such as a band saw blade or a cutterhead. In the illustrate embodiment, the working tool 108 is a saw blade that is powered by a motor M mounted underneath the table 102. The power tool may incorporate a safety feature such as a riving knife 106 and a blade guard (not shown) mounted to the riving knife. In the instance of a rotary saw, such as the table saw of FIG. 1, the motor may be supported on a carriage (not shown) that is movably mounted to the table to permit adjustment of the height of the blade above the work surface 104 as well as the angle of the cutting blade to the surface 104 for performing angled cuts. For instance, in a typical portable table saw, a manual crank mechanism 110 is provided that allows raising and lowering the saw blade. In some embodiments, an electronic or sensor-based height/angle adjustment assembly is provided to automatically raise or lower the saw blade upon detection of the depth of the workpiece and/or tilt the saw blade. The user may override the operation of the automatic height adjustment assembly via a user interface. A similar manual crank (not shown) may be provided to perform the angle adjustment. In certain table saws, a control module 115 (FIG. 2), such as an electronic control module (ECM), may be provided to control the operation of the motor. In a typical tool the control module 115 may be provided with a user interface (not shown) that permits operator adjustment of the blade cutting speed and that allows push-button activation and de-activation of the tool. In some embodiments, the user interface may include a remote control, a touch panel, or the like.

In one aspect of the present disclosure, a material sensor 120 is provided that is mounted to the underside of the work surface 104 upstream downstream of or in immediate proximity to the tool slot 109 or more particularly the cutting zone adjacent the cutting blade 108, as depicted in FIG. 2. In one embodiment the sensor 120 may be arranged to overlap part of the tool slot and may be configured to be positioned as close to the cutting blade as possible, such as by providing a beveled or curved end 122 immediately adjacent the blade. In some embodiments, the material sensor 120 is either disposed over or embedded within and preferably flush with the table top. In either case, the material sensor 120 includes an upper surface 123 configured for smooth passage of the workpiece W. The material sensor 120 is configured to sense the workpiece W through the table 102, or to directly sense the workpiece in the case of a flush mounted sensor. In certain embodiments, the table 102 may be modified to include an opening or openings for unimpeded transmission of sensor signals to and from the material sensor 120. The material sensor 120 may be formed from a single sensor die, a plurality of sensors in a package, or a sensor strip.

The material sensor 120 may be configured to detect specific properties of the workpiece material, such as density, and/or to detect the type of material, such as wood or metal, and/or to detect the presence of inhomogeneous particles in the workpiece, such as a nail in wood. The sensor 120 can be of a variety of types such as optical, light, proximity, motion, reed type, acoustic, camera-based, imaging, IR, capacitive, piezoelectric, radar, sonar, ultrasonic, distance measuring, or the like. The material sensor may also be configured to detect the workpiece material "on the fly", meaning as the workpiece is being advanced in the "feeding direction" (FIG. 2) toward a rotating saw blade 108.

The material sensor 120 communicates with the control module 115 which is configured to process the sensor signals and make appropriate determinations regarding the operation of the cutting blade. In particular, the sensor 120 may communicate with a microprocessor 117 according to the circuit diagram of FIG. 3. The microprocessor receives the signal on output line 121 of the sensor and produces control signals to control the activation of relays 118 operable to control the operation of the motor M. In particular, the microprocessor 117 generates a pulse-width modulated signal to one of the relays 125, 126 that control the operation of the motor, namely, the activation/deactivation (relay 125 or relay 126) and the speed of the motor (relay 125 and relay 126). The microprocessor may be configured to generate a control signal to control the motor supply voltage 128 to directly vary the motor rotational speed.

The material sensor 120 may include one or more of a variety of sensors, such as light, acoustic, inductive, capacitive displacement, thermal and magnetic. Each type of sensor is suitable for detecting particular properties or particular materials. For instance, a magnetic sensor can sense the ferromagnetic properties of metallic materials, such as a metallic workpiece W or a workpiece that includes a metallic component. An acoustic sensor, such as an electromagnetic acoustic transducer (EMAT) or a micro-electromechanical system (MEMS) acoustic transducer, is well suited for wood or other less dense materials. A light sensor may be limited to proximity sensing or may be calibrated to sense material based on the surface characteristics. For instance, a light sensor may be calibrated to detect the difference between a metal workpiece that may be more reflective and a wood workpiece that is less reflective. The material sensor 120 may be configured to detect the presence of inhomogeneous particles in the workpiece, such as by using a capacitive or eddy current sensor to detect a metal element (i.e., a nail) in a wood workpiece. In this instance, the material sensor may be used to screen a workpiece before a cutting operation commences, such as by running the workpiece over the material sensor 120 in a direction perpendicular to the feeding direction.

The material sensor 120 may thus include a combination of the above-identified sensors (120a, b, . . . ) to permit detection of all types of materials and/or inhomogeneities in the workpiece. The separate sensor 120a, b, . . . may be arranged along or transverse to the feeding direction. In this instance, the control module 115 and more particularly the microprocessor 117 is configured to distinguish between signals provided by different sensor elements 120a, b, . . . in the material sensor 120. For instance, a signal from an acoustic sensor 120a can be interpreted by the control module to indicate that the workpiece is made of wood, given that an acoustic sensor is generally ineffective for a metallic or ceramic workpiece. A concurrent signal from a magnetic sensor 120b can further be interpreted to indicate that a metal element, such as a nail, is present in a non-metallic (and therefore acoustic sensible) workpiece. On the other hand, no signal from the acoustic sensor and a signal from the magnetic sensor can be interpreted to mean that the workpiece is made of metal. For a sensor 120 that incorporates multiple types of sensors, the output line 121 may include separate output lines (121a, b, . . . ) for each type of sensor. The microprocessor 117 can be programmed or configured to compare the signals received on the sensor output lines 121a, b, . . . with threshold values indicative a particular material and material density. For instance, a non-null signal 121a from an acoustic sensor 120a may signify the presence of a wood workpiece W. The magnitude of the signal 121a may be indicative of the density of the material. For instance, a lower magnitude is indicative of a more dense wood of the workpiece W. The operation of the cutting blade 108, and more particularly the motor M, may be adjusted based on the density of the material, since a more dense material may require a greater blade cutting speed than a less dense material.

The control module 115 and/or microprocessor 117 are adapted to control the operation of the motor M and optionally to also adjust the height of the saw blade 108 based on the material composition of the workpiece W. With respect to the blade height adjustment, the material sensor 120 may be integrated with another sensor operable to determine the thickness of the workpiece. The blade height is a function of the workpiece thickness and an optimum height above the workpiece, which optimum height may be a function of the workpiece material. In one embodiment, a look-up table is stored in a memory in the control module 115 that correlates sensor signal values with motor and saw blade control parameters. The saw blade control parameters may include the optimum dimension/height above the workpiece thickness based on material composition. The motor control parameters may include: a) regulating and/or correcting the speed of the cut shortly before approaching the material as well as during the cut; b) once the teeth are engaged into the workpiece increasing the speed to a predetermined value until the cutting operation is almost complete; c) once the workpiece has moved to a predetermined position relative to the sensor detection area (i.e., when the cut is nearly complete) gradually reducing the motor speed to the end of the cut; and d) once the workpiece has moved entirely out of the sensor area, meaning that the cut is complete (i.e., when the material sensor signal 121 is a null value), de-energizing the motor. The position of the workpiece W may be verified by proximity sensors (not shown), and/or the engagement of the workpiece by the cutting blade may be verified by sensors associated with the blade and/or motor.

Adjusting the motor control parameters as a function of the workpiece material can increase tool life and enhance the safety of the cutting operation. For instance, approaching a metal workpiece generates significant stress in the cutting blade teeth and can cause fractioning of a carbide tipped blade. A lower speed at the initial engagement of the cutting blade with the workpiece increases tool life and reduces the risk of kick-back at the instant when the teeth "grab" the workpiece. Reducing the speed at the end of the cut improves the quality of the cut, reduces the generation of burrs and splinters and decreases the risk of injury to the tool operator. Automatic shut-off provides the obvious safety benefit of not requiring the operator to divert his/her attention away from the spinning saw blade or workpiece in order to de-activate the motor. It is thus contemplated that the table look-up feature of the microprocessor 117 may provide a blade speed profile that is initiated once the blade contacts the workpiece and that continues until the blade passes entirely through the workpiece. The blade speed profile is a function of the material and/or material properties (such as density).

The look-up table may categorize operating parameters according to categories of materials and material densities. For instance, general categories of materials may include metal, wood, ceramic and plastic. General categories of densities may hard, medium and soft. Each general category may be associated with a predetermined motor control regimen, which may be incorporated into a table look-up as discussed above.

Figure 3:
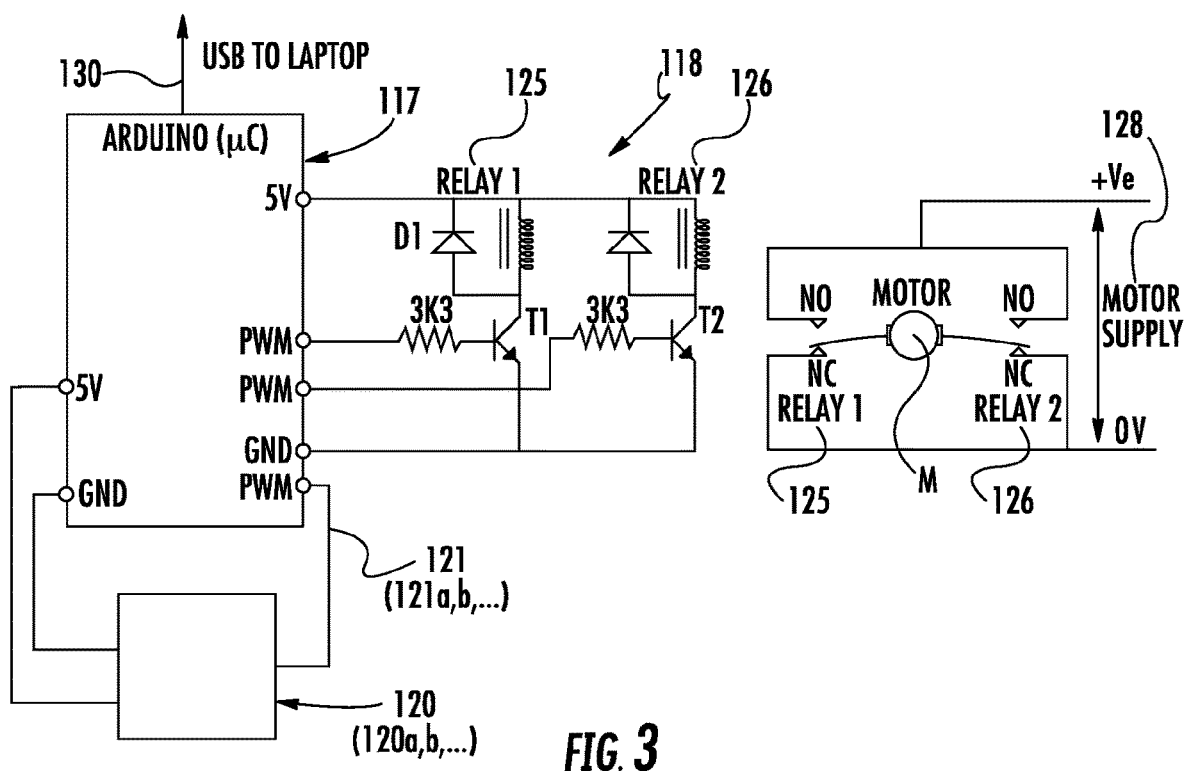
FIG. 3 depicts a schematic diagram of the circuitry and electronic control module (ECM) for material sensor of FIG. 2.

The improved power tool 100 described herein permits "touch-less" evaluation of a workpiece to determine the material of the workpiece and to use this information to control the operation of the tool, thereby improving the efficiency and safety of the cutting operation. The improved power tool 100 may also be able to share or transfer the detected information with an external device such as a computer, a laptop, a smart phone, a tablet, a diagnostic device, or the like. The share/transfer of the detected information can be accomplished either wirelessly, wired (such as via a USB as depicted in FIG. 3), touch (NFC), or the like. Since the system is microprocessor based the material sensing and tool operation control can occur interactively as the operator is advancing the workpiece toward the cutting tool or saw blade 108.

Alternatively, and perhaps preferably, the workpiece is advanced to a staging area on the table 102 immediately adjacent the material sensor 120 and held at the staging area for a predetermined time before advancing the workpiece toward the cutting tool. In this instance, the controller 115 may be configured to generate an audible or visible signal to indicate when the workpiece is properly positioned at the staging area and to indicate when it is appropriate to advance the workpiece. For instance, a red light may be energized when the workpiece is at the staging area, a yellow light may be energized as the controller evaluates the workpiece material, adjusts the blade height and commences operation of the saw blade, and a green light may be energized when it is acceptable for the operator to perform the cut. Once the cut is commenced, the cutting tool or saw blade operation can continue automatically, as described above, up to and including motor shut-down or reduction of motor speed once the cut is complete.

The power tool 100 described herein contemplates a material sensor 120 that is capable of detecting a wide range of materials and material properties. The materials may be wood, metal, plastic, engineered compositions, ceramic, tile, stone and any other material capable of being cut with a power tool and susceptible to detection by a sensor. The sensor or sensors in the material sensor 120 are configured for non-destructive "touchless" detection of material and material properties, such as density. The material sensor 120 and its individual sensors 120a, b, . . . may be affixed to the underside of the table 102 to be in close proximity to the workpiece. The sensors may be configured and calibrated to evaluate a workpiece having a maximum thickness that can be cut with the particular tool or saw blade, or may have a limited range that is less than the maximum workpiece thickness but that is still capable of accurately determining workpiece material. The material sensor 120 may also incorporate a simple proximity function to indicate whether a workpiece is at the staging area and whether the workpiece has moved past the sensor at the end of the cut. The material sensor may incorporate one or more of a variety of sensor technologies, as explained above. In the realm of optical sensors, the sensor may be an infrared sensor or a charge-coupled device (CCD) with a known sensing range. Sound-based sensors may include an ultrasonic range sensor or a Doppler effect sensor. Electrical or magnetic sensors can include capacitive (such as a wall stud sensor), capacitive displacement, Hall effect or eddy current sensors.

It can be appreciated that the material sensor 120 may be used independent of any cutting operation. In this case, the operator may simply move the workpiece over the material sensor 120 in a direction perpendicular to the feeding direction (FIG. 2). In one alternative, the material sensor 120 may be removable from the power tool table 102 to be manually moved over the workpiece apart from the power tool. In the case of independent evaluation of the workpiece material, the material sensor may be used to determine the location of inhomogeneities in the workpiece, such as the presence of a nail. The operator may then mark the location on the workpiece and use that mark to position the workpiece so that the cut avoids the inhomogeniety, particularly when the cutting tool is not suitable for cutting through the inhomogeniety (such as a saw blade configured for cutting wood encountering a metal nail). In some embodiments, the material sensor 120 is integrated within an external portable device such as a smart phone, tablet, a diagnostic device or the like. The user may then mount the portable device under the table top for detection of the material properties. Alternatively, the user may suspend the portable device over a structure such as a blade guard with the portable device aimed at the workpiece for detection of the material properties.

In yet another embodiment, the material sensor may be mounted on a boom or fixture that can be directed over the workpiece to perform the material evaluation. A boom mounted sensor 120 may be integrated into the automatic system described above or may be used independently. The material sensor may also be coupled to the working tool itself, such as for power tools in which the working tool travels over a stationary workpiece. The material sensor is positioned relative to the tool to "see" the workpiece first before engagement by the tool so that the material sensor signal can be received and processed by the controller.

The controller 115 can be configured to receive the signal(s) from the material sensor 120, to conduct the material evaluation by evaluating the output signal(s) and to store the results in a memory. Alternatively or in addition the controller may determine the tool height adjustment and motor operating parameters from a table look-up and save these parameters for subsequent implementation. As a further alternative or addition, the controller may interface with an external device and/or a display to inform the operator of the detected material and/or describe the selected operating parameters. For instance, as shown in FIG. 3 the microprocessor 117 may include a USB interface 130 that can be connected to a laptop or desktop computer. The external computer may be configured to allow the operator to interface directly with the microprocessor to not only receive the sensor information but also to transmit operating instructions to the microprocessor. In this instance the external computer may incorporate the table look-up described above or some other algorithm or parameter storage that provides the height adjustment and motor operation parameters.

It is further contemplated that the material detection features described herein may be incorporated into a complete automation and control system for all aspects of the operation of the power tool 100. For instance, the material sensor 120 may be integrated with components operable to: a) sense workpiece thickness in order to automatically adjust blade height; b) determine and/or automatically adjust blade bevel angle; c) determine and/or automatically adjust the position of a riving knife and/or blade guard; and/or d) detect and mitigate blade kick-back conditions. All of these components may cooperate to improve safety, convenience, performance, precision, quality and reliability of the operation of the power tool 100. The integrated system may also provide data for external access to monitor the performance of the power tool and/or to track and record cutting operations performed with the tool.

It should be appreciated that while the power tool illustrated in the figures is a portable saw, the material sensor system described herein can be used on a variety of other power tools, portable and stationary (and fixed), including bench top tools such as miter saws, band saws, coping saws, drills, etc. It should further be appreciated that the sensor 120 may be integrated into a power tool, such as in the table 102, or may be configured to be added to an existing tool In the latter case, the sensor 120 may be affixed to the underside of the table 102 in a suitable manner, such as by an adhesive that does not otherwise interfere with the operation of the sensor. The output 121 of the sensor may be coupled to an external input for a controller or microprocessor associated with the power tool.

It can also be appreciated that the location of the sensor 120 may be determined by the material of the table 102. For instance, if the table is metallic, positioning the sensor beneath the table would frustrate the ability to sense the workpiece. However, even with a metallic table, the sensor 120 can be located to "see" the workpiece through the slot 109. As an alternative, the sensor may be embedded within the table 102 so that the sensor is flush with the surface 104. In many power tools, the table, or at least the work surface 104, is formed of a non-metallic material, such as a plastic, which does not interfere with the metal and wood sensors described herein.

Figure 4:
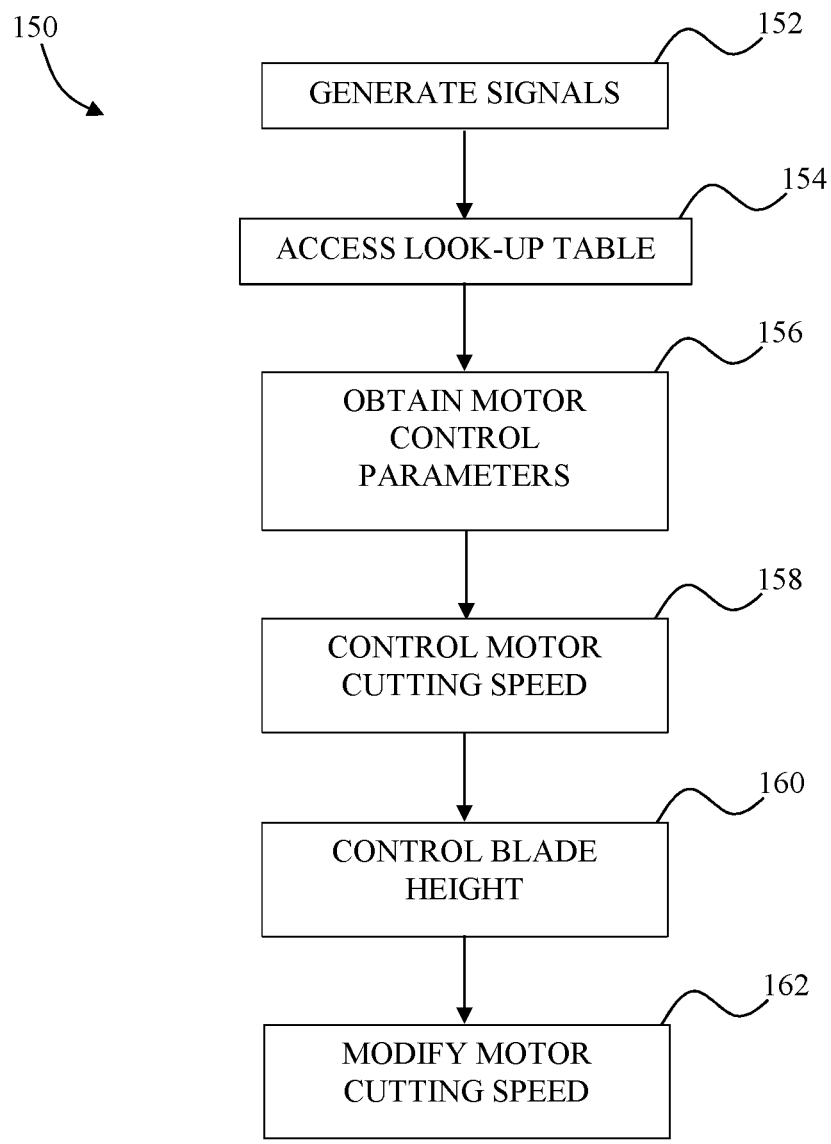
FIG. 4 shows a block diagram of a process executed by the ECM of FIG. 3.

The improved power tool 100 is operated in one embodiment in accordance with the process 150 of FIG. 4. At block 152 the material sensor 120 generates one or more signals indicative of a material type of the workpiece (W). The microprocessor 117 receives the generated signal or signals and accesses a look-up table stored in a memory of the ECM 117 (block 154) to obtain one or more motor control parameters associated with each generated signal (block 156). The microprocessor 117 then controls the motor (M) based upon the obtained motor control parameters at block 158 to a first cutting speed associated with the obtained motor control parameter. In one or more embodiments the microprocessor 117 further controls the blade height at block 160 based upon the generated signal.

At block 160, the blade engages the workpiece and at block 162 the microprocessor 117 in some embodiments controls the motor (M) to increase the cutting speed in accordance with the obtained motor control parameter.

The present disclosure contemplates a power tool having a motor driven tool with parameters of operation of the power tool that depend upon the material of the workpiece. The power tool is provided with a material sensor that determines the material of the workpiece in a non-destructive manner and then provides that information to a controller that is configured to determine the parameters of operation of the tool based on the sensed material. In a further aspect, the parameters may include blade speed and speed profile for a rotary saw power tool, and may also include blade height. In another aspect, the material sensor works interactively with the operation of the power tool during a cutting operation to rapidly sense the material and direct the motor-driven tool accordingly during a single cutting operation. The material sensor may include multiple sensors capable of sensing different materials.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power tool having a working tool for performing an operation on a workpiece, the working tool driven by a motor, comprising:

a first material sensor positioned to sense the workpiece prior to engagement of the workpiece with the working tool, the first material sensor configured to sense a first property of a metal material and to generate a first output indicative of the presence of the metal material based upon the sensed first property;

a second material sensor positioned to sense the workpiece prior to engagement of the workpiece with the working tool, the second material sensor configured to sense a second property of a non-metallic material and to generate a second output indicative of the presence of the non-metallic material based upon the sensed second property;

a memory with a look-up table stored therein, the look-up table including a first set of motor control parameters associated with performing the operation on the metal material, and a second set of motor control parameters associated with performing the operation on the non-metallic material; and a microprocessor operably connected to said memory, said first material sensor, said second material sensor and the motor, and configured to (i) select the first set of motor control parameters when the first output indicates the metal material is present and the second output indicates that the non-metallic material is not present, (ii) select the second set of motor control parameters when the first output indicates the metal material is not present and the second output indicates that the non-metallic material is present, (iii) determine a location of an inhomogeneity in the workpiece when the first output indicates the metal material is present and the second output indicates that the non-metallic material is present; and (iv) control the motor to a first cutting speed associated with the selected first set of motor control parameters or second set of motor control parameters using said look-up table.

2. The power tool of claim 1, wherein the non-metallic material is a wood material.

3. The power tool of claim 2, wherein the second output is further indicative of the density of the wood material.

4. The power tool of claim 2, wherein the second material sensor is an acoustic sensor.

5. The power tool of claim 1, wherein the first material sensor is a capacitive or magnetic sensor.

6. The power tool of claim 1, wherein the microprocessor is further configured to control activation of the motor in response to said first and second outputs prior to engaging the workpiece with the working tool, and to automatically control deactivation of the motor after completion of an operation on the workpiece.

7. The power tool of claim 1, wherein the microprocessor is configured to control the motor, based upon the selected first set of motor control parameters or second set of motor control parameters, to a second cutting speed while the working tool engages the workpiece, the second cutting speed greater than the first cutting speed.

8. The power tool of claim 1, in which the power tool includes a table defining a surface for supporting the workpiece and a slot for receiving the working tool therethrough, wherein at least one of the first material sensor and the second material sensor is mounted to the table flush with or below the surface.

9. The power tool of claim 8, wherein the at least one of the first material sensor and the second material sensor is adjacent the working tool.

10. The power tool of claim 9, in which the working tool is a circular blade and wherein the at least one of the first material sensor and the second material sensor includes at least one end immediately adjacent the circular blade configured to provide clearance for the circular blade.

11. A power tool having a circular cutting blade, a motor driving the cutting blade, a table defining a surface for supporting a workpiece and a slot for receiving the cutting blade therethrough, comprising:
 a material sensor positioned to sense the workpiece prior to engagement of the workpiece with the cutting blade, the material sensor configured to sense a property of a type of material and to generate at least one signal indicative of a material type of the workpiece based upon the sensed property;
 a memory with a look-up table stored therein, the look-up table including at least one first cutting speed parameter associated with a workpiece of a first material type, and at least one second speed parameter associated with a workpiece of a second material type; and
 a microprocessor operably coupled to the memory, said material sensor, and the motor, and configured to access the look-up table to select one of the at least one first cutting speed parameter and at least one second speed parameter based upon the generated at least one signal to control the motor to one or more cutting speeds, wherein the microprocessor is further configured to control a height of the cutting blade based upon said at least one signal generated by said material sensor by accessing the look-up table.

12. The power tool of claim 11, wherein the material sensor includes at least one of 1) a sensor configured to generate a first of the at least one signal indicative of a metallic type material, and 2) a sensor configured to generate a second of the at least one signal indicative of a non-metallic type material.

13. The power tool of claim 12, wherein the sensor is configured to generate the second of the at least one signal indicative of a non-metallic type, and the second of the at least one signal is indicative of a wood material.

14. The power tool of claim 13, wherein the second of the at least one signal is further indicative of the density of the wood material.

15. A power tool having a working tool for performing an operation on a workpiece, the working tool driven by a motor, comprising:
 at least one material sensor positioned to sense the workpiece prior to engagement of the workpiece with the working tool, the at least one material sensor configured to sense a property of a type of material and to generate at least one signal indicative of a material type of the workpiece based upon the sensed property;
 a memory with a look-up table stored therein, the look-up table including a first set of motor control parameters and a second set of motor control parameters, the first set of motor control parameters associated with a workpiece of a first material type, and the second set of motor control parameters associated with a workpiece of a second material type; and
 a microprocessor operably connected to the memory, the material sensor, and the motor, the microprocessor configured to (i) select one of the first set of motor control parameters and the second set of motor control parameters based upon the generated at least one signal, (ii) control the motor to a first cutting speed associated with the selected first set of motor control parameters or second set of motor control parameters by obtaining motor control parameters of the selected first set of motor control parameters or second set of motor control parameters from the look-up table, and (iii) control the motor, based upon the selected first set of motor control parameters or second set of motor control parameters, to a second cutting speed while the working tool engages the workpiece, the second cutting speed greater than the first cutting speed.

16. The power tool of claim 15, wherein:
 the microprocessor is further configured to control the motor, after controlling the motor to the second cutting speed and based upon the selected first set of motor control parameters or second set of motor control parameters, to a third cutting speed while the blade engages the workpiece, the third cutting speed less than the second cutting speed.

17. The power tool of claim 16, wherein:
 the microprocessor is further configured to control a height of the working tool in response to said at least one signal generated by said at least one material sensor by accessing the look-up table.

18. The power tool of claim 15, wherein:
 the at least one material sensor is configured to generate a second signal in response to a metallic element in a non-metallic workpiece; and
 the microprocessor is further configured to determine a location of an inhomogeneity in the workpiece based upon the second signal.

19. The power tool of claim 18, wherein the first material sensor is configured to generate the first output while being manually moved over the workpiece.

20. The power tool of claim 1, wherein the microprocessor is further configured to control a height of the working tool in response to said first and second outputs by accessing the look-up table.

* * * * *